June 12, 1928.

J. C. SCHELLENG 1,673,026

SEMIMECHANICAL RECTIFIER

Filed July 28, 1922

Inventor:
John C. Schelleng.
by Joel C.R. Palmer
Att'y

Patented June 12, 1928.

1,673,026

UNITED STATES PATENT OFFICE.

JOHN C. SCHELLENG, OF EAST ORANGE, NEW JERSEY, ASSIGNOR TO WESTERN ELECTRIC COMPANY, INCORPORATED, OF NEW YORK, N. Y., A CORPORATION OF NEW YORK.

SEMIMECHANICAL RECTIFIER.

Application filed July 28, 1922. Serial No. 578,122.

This invention relates to means for rectifying polyphase alternating current and has for its object a combination of circuits and apparatus for rectifying polyphase alternating current by the use of a minimum number of rectifying elements and by means of which sparking will be eliminated.

In accordance with the general features of this invention, rectification of polyphase alternating current is accomplished by means of an apparatus comprising two or more uni-lateral conducting elements cooperating with two or more synchronous commutators. The uni-lateral conducting elements are placed in series with the circuit to which the rectified current is to be delivered, and the commutators are arranged to make connection progressively from the uni-lateral conducting elements to the source of phase voltage. This is done in such a manner that each source of phase voltage is connected through one of the uni-lateral conducting elements to the direct current circuit, during the portion of each when its phase voltage is greater than any other of the phase voltages, and for a short interval before and after such periods.

Prior to this invention, polyphase current has been rectified by apparatus in which a uni-lateral conducting element is connected to each source of phase voltage. This requires as many uni-lateral conducting elements as there are phases in the polyphase system; and each element must be capable of carrying substantially all of the current. By means of the present invention the number of uni-lateral conducting elements required are reduced to a minimum, and since the commutators are arranged so that the connection between a source of phase voltage and a uni-lateral conducting element is undisturbed during such time as the voltage of that phase is greater than the voltages of all other phases, no sparking can occur.

Figure 1:
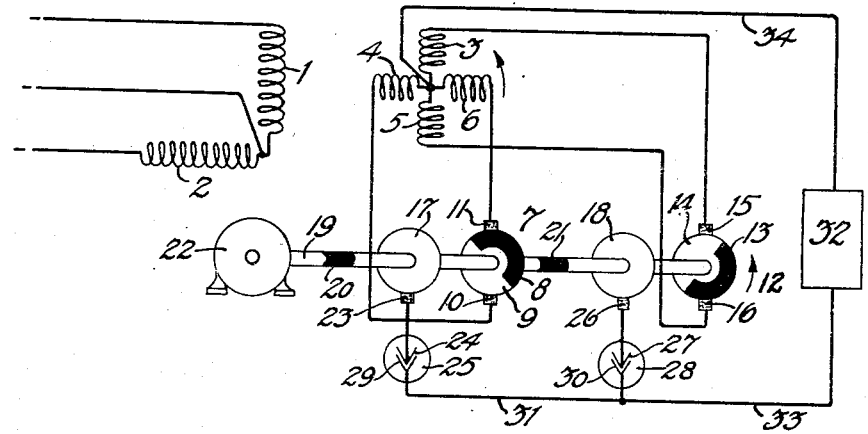
Fig. 1 shows the invention adapted to rectify quarter-phase current.

Transformer primary windings 1 and 2 (Fig. 1) are energized from a two-phase three-wire supply; and secondary windings 3, 4, 5, and 6 are connected in star to give quarter-phase four-wire output. Designated as a whole by 7 is a commutator having an insulating portion 8 and a conducting portion 9. Cooperating with commutator 7 are brushes 10 and 11 connected to windings 4 and 6, respectively, as shown. A second commutator 12 has an insulating portion 13 and a conducting portion 14; and cooperating with commutator 12 are brushes 15 and 16 connected to windings 3 and 5, respectively. A slip-ring 17 is electrically connected to 9; and a second slip-ring 18 is electrically connected to 14. Commutators 7 and 12, and slip-rings 17 and 18 are mounted as shown on a shaft 19, having insulating sections 20 and 21, and are driven in synchronism with the transformer E. M. F.'s by a motor 22.

Making contact with slip-ring 17 is a brush 23 connected to electrode 24 of a rectifying element 25, which may be of any well-known type, and making contact with slip-ring 18 is a brush 26 connected to electrode 27 of a second similar rectifying element 28. Electrodes 29 and 30 of rectifying elements 25 and 28 respectively, are connected together by conductor 31 and placed in series with a direct current load 32 by means of conductor 33. Load 32 may be a direct current motor, storage batteries to be charged, or any aggregation of devices which utilize direct current energy. Conductor 34 completes the D. C. circuit from the load to the neutral point of the transformer secondary.

The numerals 3', 4', 5', and 6' (Fig. 2) represent the E. M. F.'s induced in windings 3, 4, 5, and 6 respectively. Directly above the positive maximum values of voltage waves 3' and 5' are the centers of rectangles 14' which show the time during which commutator segment 14 is connected to winding 3 or 5 as the case may be. Similarly rectangles 9' show the time during which commutator segment 9 is connected to windings 4 or 6 as the case may be. Curve 35 shows to the same scale as curves 3', 4', 5', and 6', the voltage which is applied to the D. C. circuit, Curve 36—37—38—39—40—41—42—43—44 shows approximately the direct current supplied to the load by windings 6 as the result of phase voltage 6'.

The rectification of the quarter-phase current takes place as follows:

From $a$ to $b$ phase voltage 6' is algebraically greater than all others, and winding 6 supplies direct current represented approximately by curve 36—37—38 by way of commutator segment 9. At $b$ phase voltage 3' becomes the greatest, which causes the D. C. load to be transferred to winding 3 by way of commutator segment 14. At $c$ the D. C. load is similarly transferred to winding 4, by way of commutator segment 9; at $d$, to winding 5; and at $e$ back to winding 6 by way of commutator segment 9, etc.

Segment 9 is mounted on shaft 19, 90° ahead of segment 14 and each of these segments constitutes nearly half of the circumference of its commutator. These segments are short enough to prevent short-circuiting of the transformer when the connections of the rectifying elements are being transferred from one winding to the other.

No sparking can occur between the commutator and the brushes at the time of making and breaking connections, because at that time there is no tendency for the winding connected or disconnected to supply current. This may be seen from Fig. 2. Commutator segment 9 is connected to winding 6 from $f$ to $g$, but that winding only supplies current from $a$ to $b$; similarly for the other windings.

In Fig. 3, 45, 46, and 47 are three-phase transformer primary windings, and 48, 49, 50, 51, 52 and 53 are secondary windings connected in star to give six-phase E. M. F. Cooperating with commutator 54 mounted on shaft 62, are brushes 55, 56, and 57, spaced 120° apart, and connected to windings 49, 51, and 53, respectively. Cooperating with commutator 58, mounted on shaft 62, are brushes 59, 60, and 61, spaced 120° apart and connected to windings 48, 50, and 52, respectively. Each commutator is composed of an insulating section which occupies a trifle more than two-thirds of the circumference, and a conducting section which occupies a trifle less than one-third of the circumference. Commutator 54 is mounted so that its conducting section 63 is 60° behind the conducting section 64 of commutator 58.

Electrically connected to 63 is a slip-ring 65 and electrically connected to 64 is a slip-ring 66. Making contact with slip-ring 65 is a brush 67 connected to electrode 71 of rectifying element 72; and making contact with slip-ring 66, is a brush 68 connected to electrode 69 of a second rectifying element 70. Electrodes 73 and 74 are connected together by a conductor 75 and placed in series with the D. C. load 76 by conductor 77. Conductor 78 completes the D. C. circuit back to the neutral of the transformer secondary.

Shaft 62 having insulating sections 79 and 80, is driven by motor 81 at synchronous speed.

Figure 2:
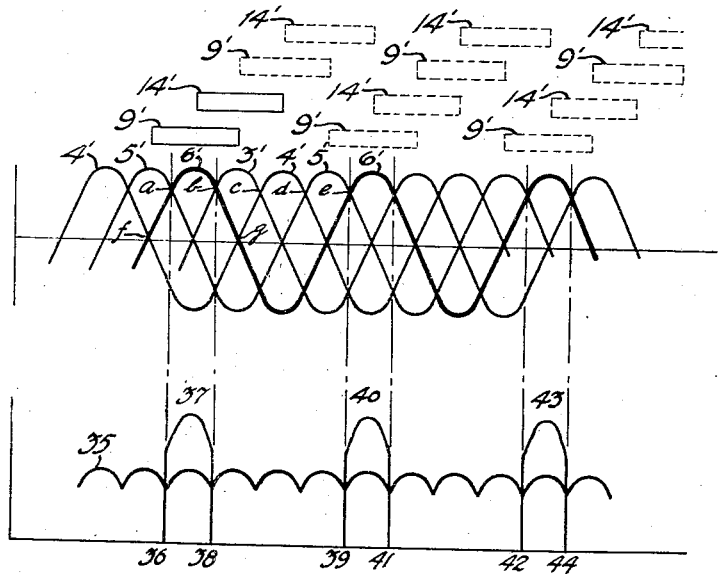
Fig. 2 shows the current and voltage relation in the circuit of Fig. 1.
Figure 3:
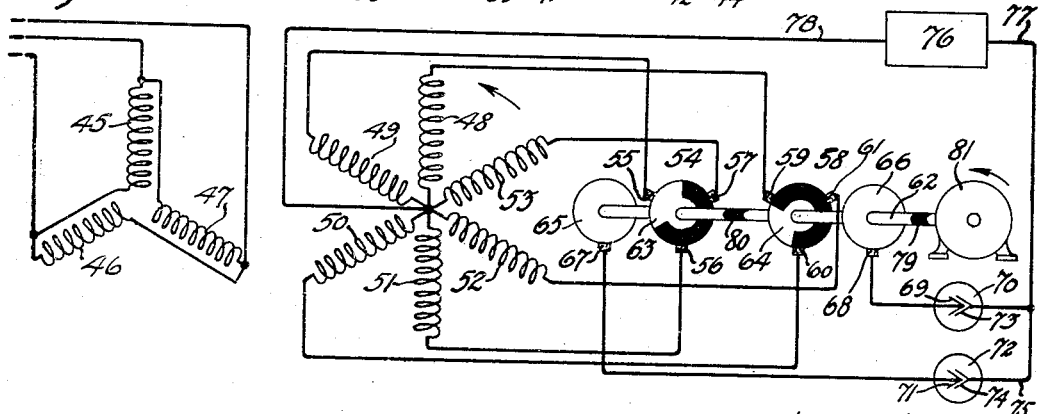
Fig. 3 shows the invention adapted to rectify six phase current.

From the explanation previously given for Figs. 1 and 2, the operation of the circuit shown in Fig. 3 will be apparent to those skilled in the art.

The examples given by way of illustration are only two falling under the general case whose current, having a number of phases equal to $m$ times $n$, is rectified, $m$ and $n$ being integers. There are employed $m$ rectifying elements and $m$ commutators, each commutator having one conducting sector extending over an angle equal to or less than $\frac{2\pi}{n}$. Cooperating with each commutator are $n$ brushes.

This invention may be used to accomplish rectification of current either for power or telephonic purposes, and it is obvious that many changes may be made without departing from the scope of the appended claims. For example, the time of rotation of the commutator shaft could be made an integral multiple of the time of synchronous speed rotation.

The invention claimed is:—

1. In combination, means for utilizing direct current energy, a single pair of uni-lateral conducting elements connected with said utilizing means, a source of polyphase electromotive force, and commutators for establishing connection between said source of polyphase electromotive force and said uni-lateral conducting elements, the number of said elements and said commutators being less than the number of phases to be rectified.

2. In combination, means for utilizing direct current energy, a single pair of uni-lateral conducting elements connected to said utilizing means, a synchronous commutator connected to each of said uni-lateral conducting elements, brushes cooperating with said synchronous commutators, and a source of polyphase electromotive force connected between said brushes and said utilizing means, the number of said elements and said commutators being less than the number of phases to be rectified.

3. In combination, means for utilizing direct current energy, a single pair of uni-lateral conducting elements connected to said utilizing means, a commutator connected to each of said uni-lateral conducting elements, three brushes cooperating with each of said commutators, and a source of six-phase electromotive force connected so that each phase voltage is applied between a brush and said utilizing means.

4. In combination, a source of polyphase voltage having a number of phases equal to $m$ times $n$, $m$ uni-lateral conducting elements, $m$ commutators each having a conducting segment extending over an angle of substantially $\frac{2\pi}{n}$, $n$ brushes cooperating with each of said commutators, and circuit connections connecting a source of phase voltage to each of said brushes, and each commutator to one of said uni-lateral conducting elements.

5. An electrical system comprising, a source of polyphase voltage, a direct current consumption circuit comprising a single pair of uni-lateral conducting elements, commutators for connecting the source of each positively increasing phase voltage to said direct current circuit at a time before its voltage becomes the greatest of the phase voltages and for disconnecting each source of phase voltage after its voltage has become less than another of said phase voltages, the number of said elements and said commutators being less than the number of phases to be rectified.

6. A rectifying system for polyphase current comprising a plurality of uni-lateral conducting elements and a plurality of switching devices associated with said uni-lateral conducting elements, the number of uni-lateral conducting elements and the number of switching devices each being less than the number of phases to be rectified.

7. An electrical system comprising a source of polyphase voltage, a direct current circuit comprising a single pair of uni-lateral conducting elements and means connecting the source of each positively increasing phase voltage to said direct current circuit at a time before its voltage becomes the greatest of the phase voltages, the number of said elements and said connecting means being less than the number of the phases to be rectified.

In witness whereof, I hereunto subscribe my name this 26th day of July A. D., 1922.

JOHN C. SCHELLENG.